United States Patent [19]

Bose et al.

[11] Patent Number: 4,998,054
[45] Date of Patent: Mar. 5, 1991

[54] PROGRAMMABLE CURRENT INITILIZATION FOR RESONANT DC LINK CONVERTER

[75] Inventors: Bimal K. Bose; Jih-Sheng Lai, both of Knoxville, Tenn.

[73] Assignee: The University of Tennesse Research Corp., Knoxville, Tenn.

[21] Appl. No.: 411,860

[22] Filed: Sep. 26, 1989

[51] Int. Cl.$^5$ ............................................. H02M 7/538
[52] U.S. Cl. ................................. 318/802; 318/799; 363/34; 363/40; 363/132
[58] Field of Search ...................... 363/37, 40, 131–132, 363/163, 34, 39–41, 44, 123, 125, 127–128, 134–135; 318/762, 803, 811, 798–804, 806–810, 811–812

[56] References Cited

U.S. PATENT DOCUMENTS

| | | | |
|---|---|---|---|
| 3,896,348 | 7/1975 | Loderer | 318/798 X |
| 4,763,059 | 8/1988 | Espelage et al. | 318/811 |
| 4,847,747 | 7/1989 | Abbondanti | 318/510 X |
| 4,862,342 | 8/1989 | Dhyanchaud et al. | 363/40 |

Primary Examiner—William M. Shoop, Jr.
Assistant Examiner—David Martin
Attorney, Agent, or Firm—James B. Hinson

[57] ABSTRACT

The invention comprises a DC link resonant converter for controlling the speed of AC machines. Switch and power supply means is provided to establish a bi-directional initial current in the resonant circuit. By selecting the plurality and magnitude of the initial current, the peak voltage of the resonant link is controlled, and reliable zero crossing of the resonant voltage is assured. Current technology permits resonant frequencies in the range of 50–100 kilohertz to be utilized.

4 Claims, 8 Drawing Sheets

PROGRAMMABLE CURRENT INITILIZATION FOR RESONANT DC LINK CONVERTER

BACKGROUND OF THE INVENTION

1. Field of the Invention

The invention relates to control systems and more specifically to resonant DC link converters for use in conjunction with AC machines.

2. Descriptions of the Prior Art

Resonant link DC to DC converters utilizing zero voltage or zero current switching schemes are available in the prior art. The resonant link concept is being extended to DC to AC converters for AC machine applications. Resonant link converters can be divided into two classes, the first using shunt resonant circuits and the second series resonant circuits. In applications such as controlling AC motors the output of the converter is coupled to the motor through a conventional inverter.

Conventional inverters may utilize either zero voltage or zero current voltage switching to reduce power loss. Zero voltage switching is currently preferred because it reduces the voltage stress on switching devices and does not require the use of snubber circuits. Voltage overshoot and the resulting stress of switching components is a generic problem with resonant link converters.

Typically, if the resonant converter operates without any load, the converter output voltage swings to twice the supply voltage. As load is increased, the voltage swing also increases. In situations where bi-directional energy transfer is provided for, the output voltage of the converter can swing to three times the supply voltage. One prior art approach to reducing this voltage swing is the utilization of voltage clamping with energy recovery. Additionally, problems are encountered during transition from the utilization to the energy feedback mode.

Reliable operation requires that the output voltage of the converter cross zero at every cycle. In prior art resonant link converters, the output voltage frequently failed to cross zero due to a finite "Q" of the resonant circuit, resulting in the voltage tending to build up on every resonant cycle.

It has been proposed that a fixed initial current be established in the inductor of the resonant link to solve the zero crossing problem. However, fluctuating and directional inverter input current tends to cause zero crossing failure unless the initial current is established on a worse case basis. Establishing an initial current on a worse case basis, worsens the voltage overshoot problem. Controlling the initial current in accordance with the criteria disclosed in this patent application solves these problems. Prior to the current invention, no solution to this problem has been proposed or implemented.

SUMMARY OF THE INVENTION

The preferred embodiment of the invention comprises a controller for controlling the flow of electric energy from a power source to a load. The controller utilizes a DC to AC converter which includes at least first and second reactive circuit elements coupled in series and between first and second terminals of a DC voltage source. A first switch periodically changes state to induce an AC current in the reactive elements at their resonant frequency. The switch is controlled to limit the postive transitions of the pulsed voltage to the desired value and to assure that the pulsed DC voltage decreases to zero during each cycle.

DESCRIPTION OF THE DRAWINGS

FIG. 7 is a schematic diagram of a resonant link converter using bi-directional initial inductor currents.

DETAILED DESCRIPTION

Figure 1:
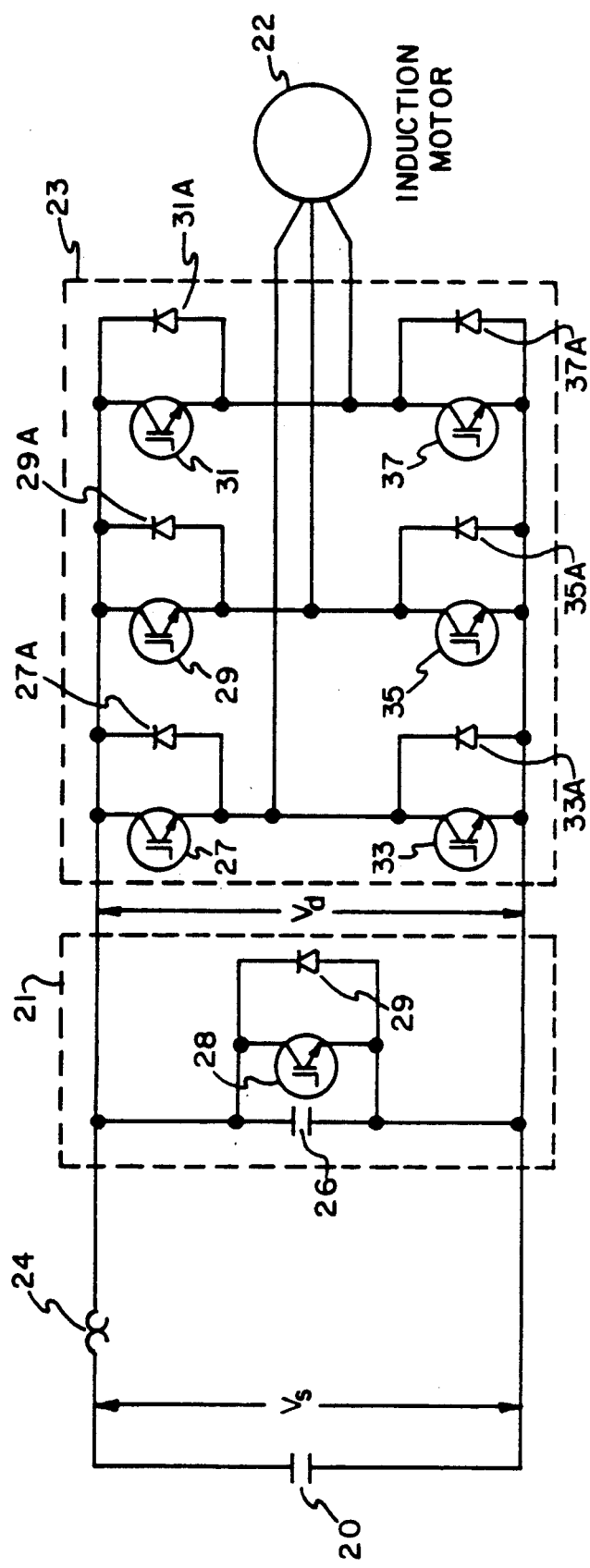
FIG. 1 is a schematic diagram of a resonant DC link converter for controlling an AC machine.

A conventional resonant DC link converter system is illustrated in FIG. 1. This system converts the DC output voltage $V_s$ of a voltage source 20 to a variable voltage, variable frequency pulsating supply voltage $V_d$ for operating an induction motor 22.

For purposes of convenience, the system can be considered as consisting of (a) a conventional voltage source 20 (b) a resonant link DC to AC converter 21 (c) a conventional inverter 23 and (d) a load 22.

More specifically, the resonant link converter 21 converts the DC output voltage $V_s$ of the voltage source 20 to a pulsating voltage $V_d$ utilizing a resonant circuit which consist of at least first and second reactive elements, for example an inductor 24 and a capacitor 26. A switch 28, preferably an insulated gate bipolar transistor, is connected in parallel with the capacitor 26 is selectively turned on and of to control the current through the inductor 24.

More specifically, at the beginning of each cycle of the pulsed voltage switch 28 is turned on to establish a predetermined current in the inductor 24. When the desired current value has been attained this switch is opened to induce an AC current in the inductor 24 and the capacitor 26 at the resonant frequency of these components. When the switch 28 is on, a diode 29 clamps the voltage across the capacitor 26 to approximately zero. Thus, except for the zero crossing interval when diode 29 is forward biased and time intervals when switch 28 is on, the output voltage $V_d$ of the converter 21 is sinusodial and has a period determined by the resonant frequency of inductor 24 and capacitor 26. The period during which switch 28 is open is referred to as the resonant cycle.

This circuit is a conventional prior art resonant link converter. A conventional inverter, including switches 27, 29, 31, 35, and 37, switches the phase currents to AC (machine) motor 23 as required to control the operation of this motor. These switches are by-passed by diodes 27A, 29A, 31A, 33A, 35A and 37A. These switches are preferably insulated gate bipolar transistors.

The voltage $V_d$ across the capacitor 26 when the switch 28 is open is determined by the current flowing in capacitor 26 which in turn is the difference between the inductor current and the input current to the inverter 23. The inverter input current $I_d$ is a function of the motor phase (load) currents. If the inverter input current $I_d$ is assumed to be constant during a resonant cycle, the maximum and minimum values of the capacitor voltage $V_d$ to assure zero crossing are determined by the initial capacitor current. The following analysis establishes the criteria for controlling the inductor current to assure the desired operating conditions.

Figure 2:
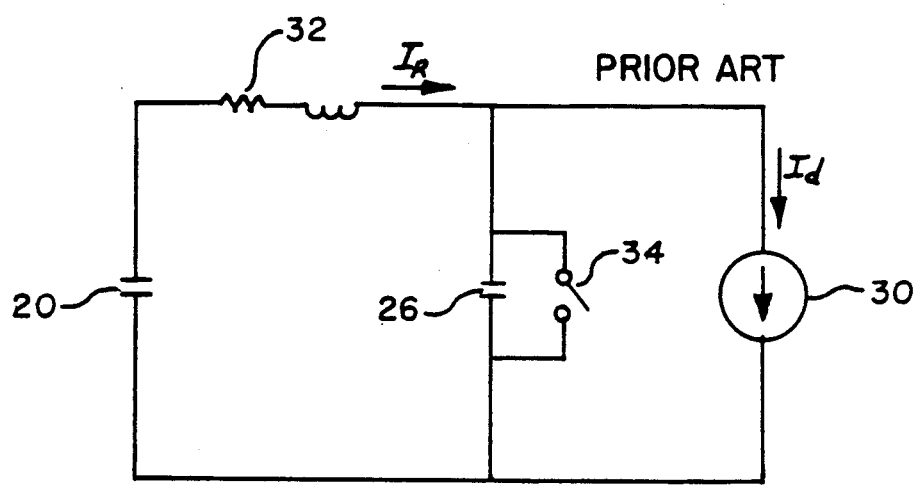
FIG. 2 is a schematic diagram of the equivalent resonant circuit of the resonant link converter during the resonance interval.

The equivalent circuit of the system is schematically illustrated in FIG. 2 assuming the input current to the inverter 23 and to the induction motor 22 are constant. In this figure the inverter 23 and motor 22 are included and illustrated as a current source 30. A resistor 32 representing the finite "Q" of the resonant circuit has been added. The solid state switch 26 is illustrated for purposes of simplicity, as a mechanical on-off switch 34 and is used, as previously discussed, to establish the desired current in the inductor 24. Under these conditions, the network equations can be written as follows with the equations numbered 1 through 10 for easy reference.

$$V_s(t) = I_r(t)R_r + \frac{dI_r(t)}{dt}L_r + V_d(t) \quad \text{Equation (1)}$$

where $L_r = 1/\sqrt{L_rC_r}$ resonant frequency (zero damping)

$\alpha = R_r/2L_r = $ decrement factor $\zeta = R_r/2Z_r = $ damping ratio $Z_r = \sqrt{L_r/C_r} = $ characteristic impedance $\omega = \omega_r\sqrt{1 - \zeta^2} = $ oscillation frequency $\theta = \cos^{-1}\zeta = \tan^{-1}\frac{\sqrt{1-\zeta^2}}{\zeta}$ $$I_r(t) = I_d(t) + C_r\frac{dV_d(t)}{dt} \quad \text{Equation (2)}$$

with initial states $V_d(0)=0$ and $I_r(0)=I_m$ $V_d$ can be calculated from the following equation.

$$V_d(t) = (V_s - I_dR_r)\left[1 - \frac{1}{\sqrt{1-\zeta^2}}\epsilon^{-\alpha\tau}\sin(\omega t + \theta)\right] + \quad \text{Equation (3)}$$

$$\frac{(I_m + I_d)Z_r}{\sqrt{1-\zeta^2}}\epsilon^{-\alpha\tau}\sin\omega t$$

$$I_r(t) = I_d + \epsilon^{-\alpha t}\left[(I_m - I_d)\cos\omega t + \frac{2V_s - (I_d + I_m)R_r}{2\omega L_r}\sin\omega t\right] \quad \text{Equation (5)}$$

In the above equations, the voltage component $(I_m - I_d)Z_r$ largely determines the capacitor voltage during the resonance interval. For purposes of this analysis a voltage overshoot is defined to mean that the maximum voltage of $V_d(t)$ is higher than $2V_s$ and zero voltage crossing means that the voltage is lower than zero. These values establish the maximum voltage stress to which components of the invention are subjected.

The following analysis analyzes these specific conditions to determine the desired operating conditions.

$$\frac{dV_d(t)}{dt} = \omega_r\epsilon^{-\alpha t}\left[\frac{2(V_s - I_dR_r) + (I_d + I_m)R_r}{2\sqrt{1-\zeta^2}}\sin\omega t + \right. \quad \text{Equation (6)}$$

$$\left. (I_m - I_d)Z_r\cos\omega t\right] = 0$$

$$\tan\omega t_n = \frac{2\sqrt{1-\zeta^2}(I_d - I_m)Z_r}{2V_s - (I_d + I_m)R_r} \quad \text{Equation (7)}$$

where $$t_n = \left[n\pi + \tan^{-1}\frac{2\sqrt{1-\zeta^2}(I_d - I_m)Z_r}{2V_s - (I_d + I_m)R_r}\right]/\omega$$

$n = 1, 2$ $$V_d(t_1) = (V_s - I_dR_r)\left[1 - \frac{1}{\sqrt{1-\zeta^2}}\epsilon^{-\alpha t_1}\sin(\omega t_1 + \theta)\right] + \quad \text{Equation (8)}$$

$$\frac{(I_m - I_d)Z_r}{\sqrt{1-\zeta^2}}\epsilon^{-\alpha t_1}\sin\omega t_1$$

where $$t_1 = \left[\pi + \tan^{-1}\frac{2\sqrt{1-\zeta^2}(I_d - I_m)Z_r}{2V_s - (I_d + I_m)R_r}\right]/\omega$$

$$V_d(t_2) = (V_s - I_dR_r)\left[1 - \frac{1}{\sqrt{1-\zeta^2}}\epsilon^{-\alpha t_2}\sin(\omega t_2 + \theta)\right] + \quad \text{Equation (9)}$$

$$\frac{(I_m - I_d)Z_r}{\sqrt{1-\zeta^2}}\epsilon^{-\alpha t_2}\sin\omega t_2$$

$$t_2 = \left[2\pi + \tan^{-1}\frac{2\sqrt{1-\zeta^2}(I_d - I_m)Z_r}{2V_s - (I_d + I_m)R_r}\right]/\omega$$

Introducing the two parameters $X_1 = I_d Z_r/V_s$ and $X_o = I_m Z_r/V_s$ the general normalized form of equations (8) and (9) are as follows:

$$\frac{V_d(t_n)}{V_s} = \quad \text{Equation (10)}$$

$$(1 - 2X_1\zeta)\left[1 - \frac{1}{\sqrt{1-\zeta^2}}\epsilon^{-\frac{\zeta}{\sqrt{1-\zeta^2}}t_n}\sin(\omega t_n + \theta)\right] +$$

-continued $$\frac{1}{\sqrt{1-\zeta^2}} \epsilon^{-\frac{\zeta}{\sqrt{1-\zeta^2}} t_n} (X_0 - X_1)\sin\omega t_n$$

Figure 3:
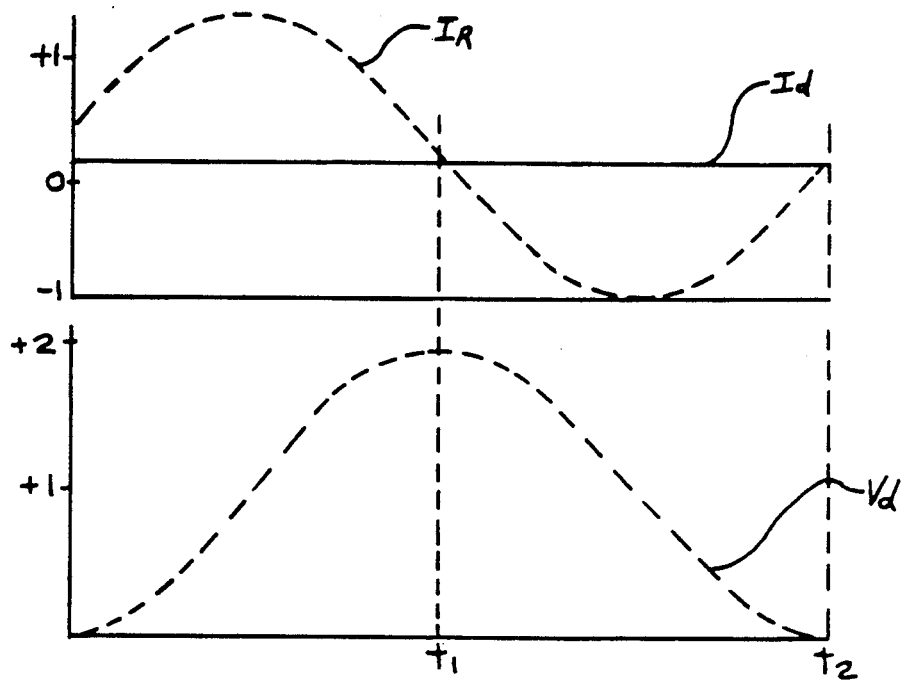
FIG. 3 is a diagram illustrating the wave forms of the voltage and current of the resonant link converter during the resonant cycle.

From the above equations, it can be seen that a voltage overshoot occurs when $V_d(t) > 2V_s$ and zero crossing is lost when $V_d(t) > 0$. As illustrated in FIG. 3, the resonant current $I_r$ normally varies between $2I_d$ and zero. Normally the inverter current $I_d$ varies between $+I_l$ and $-I_l$. $I_l$ is the peak phase current. Observing the equation (8), it can be seen that the value $(I_m - I_d)$ is the dominant factor causing overshoot. Equation (9) shows that the same factor also determines the zero voltage crossing points. This feature is utilized by the invention to control both the voltage overshoot and zero crossing intervals to restrain the peak voltage of $V_d$ to a selected value and to assure that zero crossing conditions are maintained.

Figure 4:
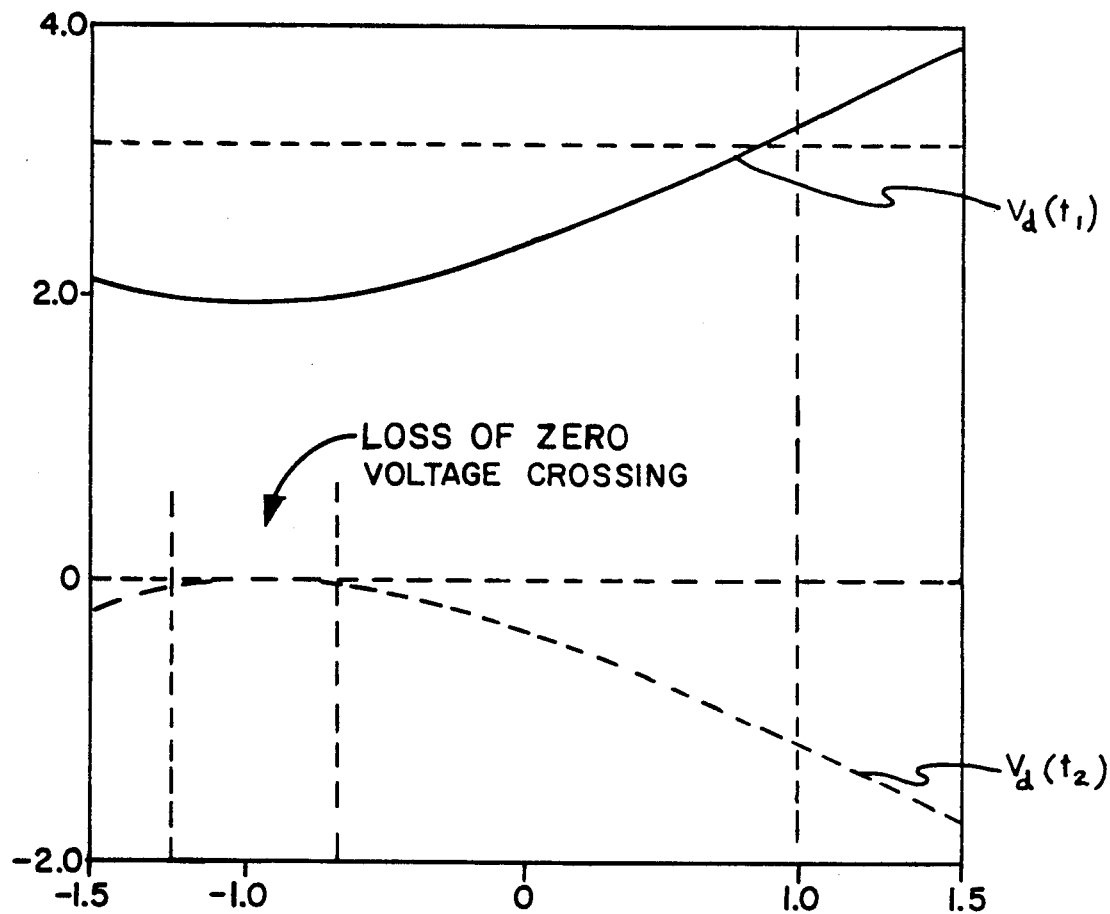
FIG. 4 is a diagram illustrating the maximum and minimum resonant circuit voltage as a function of initial inductor current.

FIG. 4 is a diagram illustrating the maximum voltage $V_d(T_1)$ and the minimum voltage $V_d(T_2)$ as a function of $I_m$. In this analysis the resonant circuit is assumed to operate at 50 Kilohertz with a resonant circuit "Q" of 150. Characteristic impedance for the induction motor 22 is assumed to be $V_s/I_l$ and the current $I_m$ is normalized with the base current $I_l = V_s/Z_r$. The initial current $I_m$ is set to be equal to $I_l$ then the voltage $V_{dt}(t_i)$ overshoots to 3.2 $V_s$. This large initial overshoot is a result of the high initial capacitor current. By contrast the magnitude of the $V_d(t_1)$ becomes minimum when $I_m - I_d = 0$. Under these conditions, the zero voltage crossing is lost. Since a zero crossing interval is desirable for controlling the inverter, the initial capacitor current is always chosen to be positive.

$I_d$ normally increases during the resonant cycle because of the high magnitude $V_d$. To compensate for this current rise, the initial capacitor current should be higher than the selected value of the graphical solution.

Figure 5:
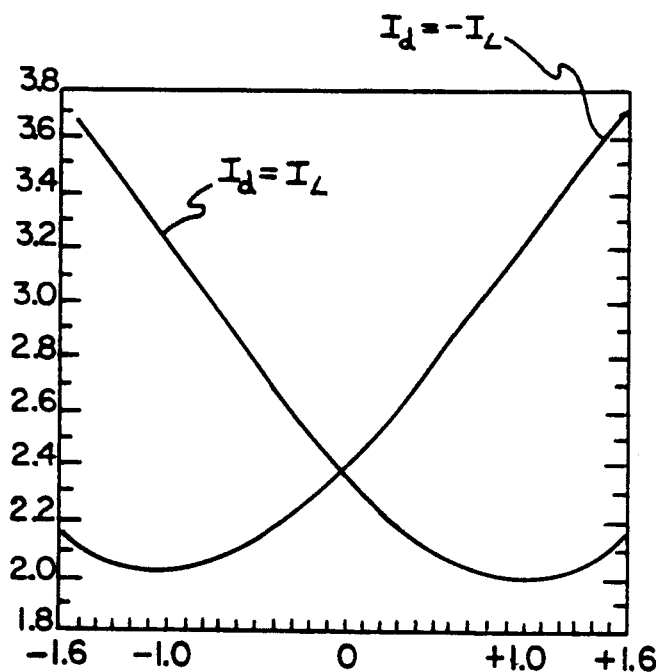
FIG. 5 is a diagram illustrating the region over which the initial current is controlled to maintain the maximum voltage within the prescribed range.
Figure 6:
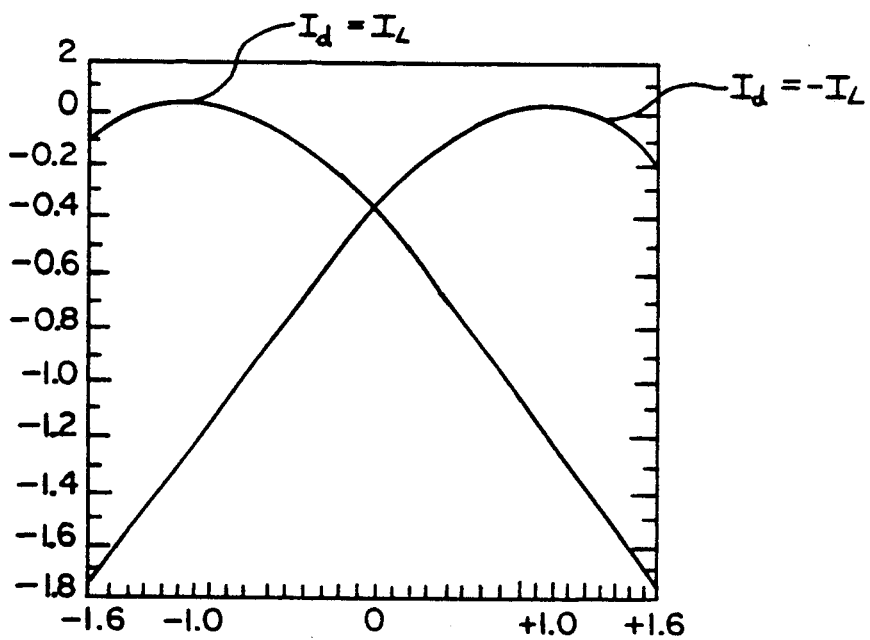
FIG. 6 is a diagram illustrating the range over which the initial current is controlled to maintain zero voltage crossing.
Figure 1:
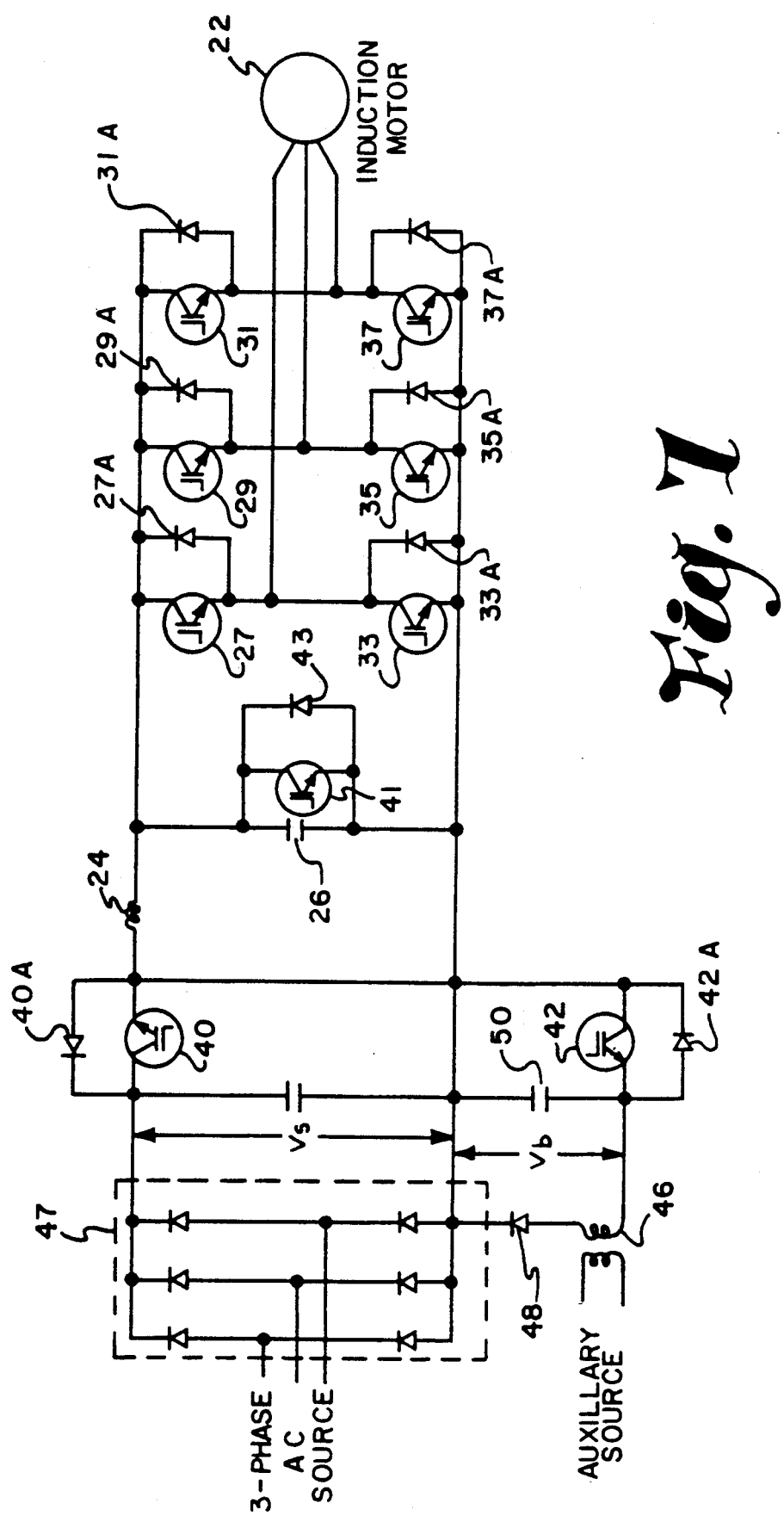

A general solution of $V_d(T_1)$ from equation 8 assuming different inverter currents is illustrated in FIG. 5. Similarly, a general solution for the minimum voltage is shown in FIG. 6. For simplicity of only two curves, two curves corresponding to $I_d = -I_l$ and $I_d = I_l$ are illustrated because the region between these curves is believed to define the practical operating limits of the circuit in order to achieve the desired operating condition.

It is evident from these curves that the initial current $I_m$ must be programmable in accordance with the inverter input current $I_d$ to satisfy the criteria for voltage overshoot and zero voltage crossing requirement. From these curves, it can also be seen that if the current $I_m$ is programmable between approximately $-0.7$ and plus $1.3$ that the desired maximum voltage of $V_d(T_1)$ and zero crossing can be maintained. The skew of the initial current $I_m$ around zero is a factor of the initial positive capacitor current requirement previously discussed with reference to FIG. 4.

The prior art circuit previously discussed and schematically illustrated in FIG. 1 is satisfactory for incrementing the initial inductor current $I_m$ at the leading edge of zero crossing interval of $I_m$ by closing the switch 28 causing the current to increase with the slope $V_s/L_r$. However, if the current $I_d$ is less than $I_m$ such that $I_m$ requires a decrease, the circuit illustrated in FIG. 1 is not satisfactory.

This limitation of the circuit illustrated in FIG. 1 is overcome by the resonant converter utilizing bi-directional initialization circuit illustrated in FIG. 7. This circuit comprises the preferred embodiment of the invention. Components not associated with current $I_m$ are identified by reference numerals previously used in FIG. 1.

In this circuit the first switch 40 normally remains closed and the current in inductor 24 is incremented by closing the switch 41 as usual. In order to decrement the current in indicator 24, switch 40 is opened and switches 42 and 41 are closed so that the inductor current decreases with a slope given by $V_b/L_r$ where $V_b$ is the output voltage of an auxilliary DC power supply comprising a transformer 46, a rectifier 48 and a filter capacitor 50. Switch 41 is turned on, as required, to control the inductor current. During normal operating conditions, the switches 40 and 42 operates at a small fraction of the resonant frequency and contribute some additional losses. However, the overall efficiency of the converter is not substantially effected. Switches 40 and 42 are respectively bypassed diodes 40A and 42A.

The switches 27, 29, 31, 33, 35, and 37 are turned on as required and subsequently discussed to provide phase currents to the induction motor 22. These switches comprise a typical prior art inverter. $V_s$ is supplied by a rectifier circuit 47.

Figure 8:
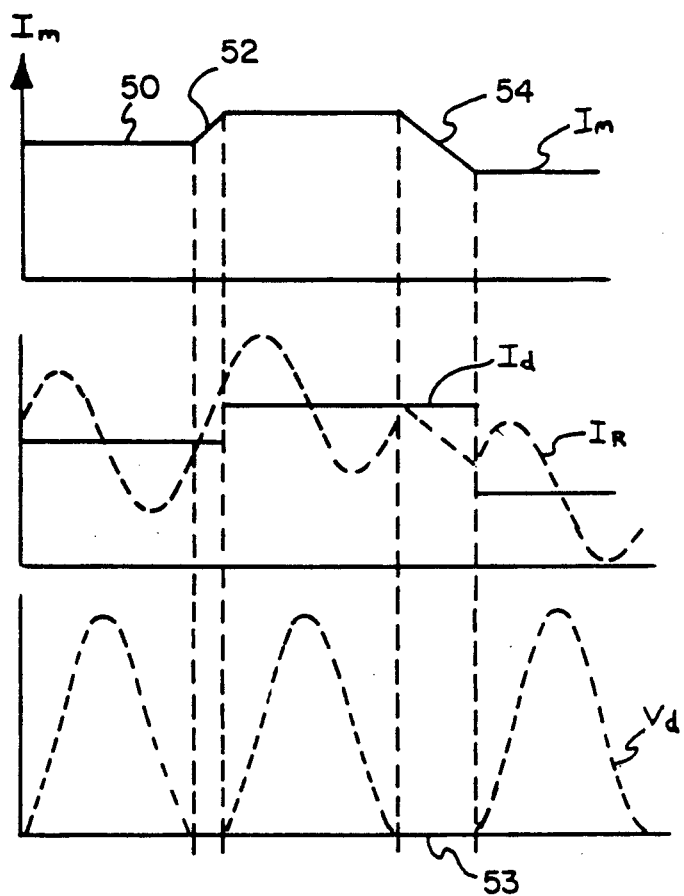
FIG. 8 is a diagram illustrating operation of a resonant link converter as the load changes.

FIG. 8 illustrates the operation of the bi-directional current initialization circuit. In evaluating the operation of the circuit three load conditions must be considered. These conditions are (1) load constant (2) load increases and (3) load decreases.

To illustrate the constant load condition, the system has been assumed to be operating at a constant current $I_d$ and stabilized as previously described. The initialization current corresponding to this condition is illustrated at reference numeral 50. The load current increases resulting in an increase in the required initialization current as illustrated at reference numeral 52. Similarly, the load decreases requiring a decrease in the required initialization current as illustrated at reference numeral 54. The slope of the changes in the initialization current is equal to $V_d/L_r$ as previously discussed. The resulting changes in $V_d$ are also illustrated.

In order to properly control the initial current, it is desirable that the value of the required $I_m$ be known at the leading edge of the zero crossing intervals, (typically illustrated at reference numeral 53) so that appropriate switching action to control the initialization current can be taken. Since the inverter is switched at or near the trailing edge of the zero crossing interval, the incoming current $I_d$ is predicted at the leading edge to determine the required value of $I_m$.

The phase currents of the inverter are controlled by hysteresis based bang-bang controller. The magnitude of phase currents is practically invariant during the small zero crossing interval permitting the logic of the inverter to be determined at the leading edge of this time interval. Implementation of this switching function is delayed until the end of the zero crossing interval. By knowing the switching logic and the inverter phase currents, the current $I_d$ can be uniquely predicted. Table 1 summarizes the relationship of the $I_d$ to the phase currents with the implemented switching patterns for the inverter which numbered 1 through 8.

| SWITCHING PATTERN NO. | SWITCHES ON | INVERTER INPUT CURRENT |
|---|---|---|
| 1 | 27, 29, 31 | $i_a + i_b + i_c = 0$ |

-continued

| SWITCHING PATTERN NO. | SWITCHES ON | INVERTER INPUT CURRENT |
|---|---|---|
| 2 | 27, 29, 37 | $i_a + i_b = -i_c$ |
| 3 | 27, 35, 31 | $i_a + i_c = -i_b$ |
| 4 | 27, 35, 37 | $i_a$ |
| 5 | 33, 29, 31 | $i_b + i_c = -i_a$ |
| 6 | 33, 29, 37 | $i_b$ |
| 7 | 33, 35, 31 | $i_c$ |
| 8 | 33, 35, 37 | $-(i_a + i_b + i_c) = 0$ |

For an isolated neutral machine, the sum of the phase current is always zero. Utilizing this function, the input inverter current can be defined by the following logical (Boolean) equation:

$$I_d = S_1 i_a + S_3 i_b + S_5 i_c \quad \text{Equation (13)}$$

Where $S_1$ = Switch 27

$S_2$ = Switch 37

$S_5$ = Switch 31

Equation 13 can be implemented by the following truth table and the above switch desiginations.

| Switch Nos & State | | | Current |
|---|---|---|---|
| $S_1$ | $S_3$ | $S_5$ | $I_d$ |
| 0 | 0 | 0 | 0 |
| 0 | 0 | 1 | $i_c$ |
| 0 | 1 | 0 | $i_b$ |
| 0 | 1 | 1 | $i_a$ |
| 0 | 1 | 1 | $-i_a$ |
| 1 | 0 | 0 | $+i_a$ |
| 1 | 0 | 1 | $-i_b$ |
| 1 | 1 | 0 | $-i_c$ |
| 1 | 1 | 1 | 0 |

Figure 9:
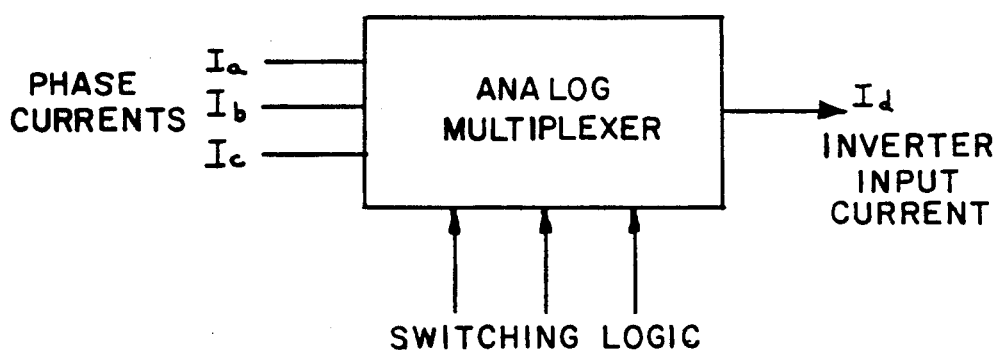
FIG. 9 is a block diagram of a circuit for calculating the expected inverter input current.

Utilizing this Truth Table, the inverter current can be calculated using the simple circuit schematically illustrated in FIG. 9.

Figure 10:
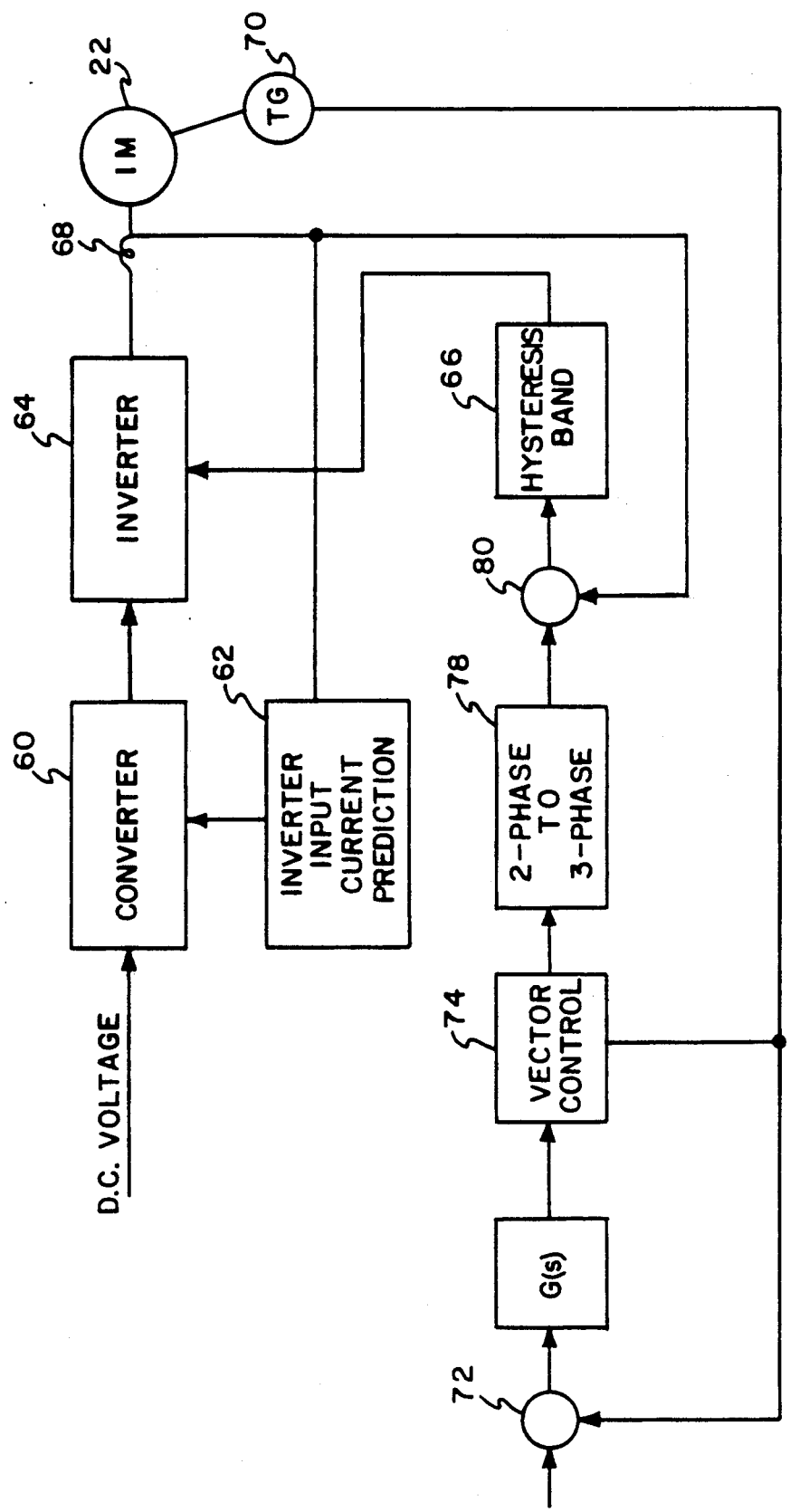
FIG. 10 is a block diagram of the control system utilizing the resonant link converter.

FIG. 10 is a functional block diagram of a system for controlling an AC motor 22 using a resonant link converter and bi-directional initial currents in accordance with the disclosed invention. More specifically, a DC voltage from a power source is coupled to the input of a resonant link converter circuit 60. The resonant link converter 60 is in turn operated by a control signal from an inverter input prediction circuit 62 to produce the voltage $V_d$ as previously discussed. Phase current sensors 68 produce current signals necessary to predict the input current.

The voltage $V_d$ is coupled to the input of a conventional inverter 64 which is in turn controlled signals produced by a hysteresis band bang-bang controller 66 to provide phase currents to the induction motor 22. Phase currents to the motor are measured by a sensor 68 to produce current measurements for each of the phases. Similarly, a tachometer 70 is coupled to the motor 22 to produce a signal indicating the direction and velocity of rotation or the AC motor 22.

The output signal of the tachometer 70 is also coupled to the input of a comparator 72 where it is compared to the desired rotational signal to produce an error signal. The error signal is processed by a current and velocity controller 74 to produce signals specifying the desired speed and phase currents. In response to these signals and the output signal of the tachometer 70, the Vector control circuit 76 produces a two phase control signal. The Vector control signal generates a two-phase signal which is processed by a two phase to three phase circuit 78 to produce current commands for each of the phases of the motor 22. The current command signals are compared to the actual current command signals by a second comparator 80 to produce a difference current signals for each phase. These signals are coupled to a hysteresis controller 66 to produce output signals which are coupled to the inverter 64 to produce the desired operating conditions.

Figure 11:
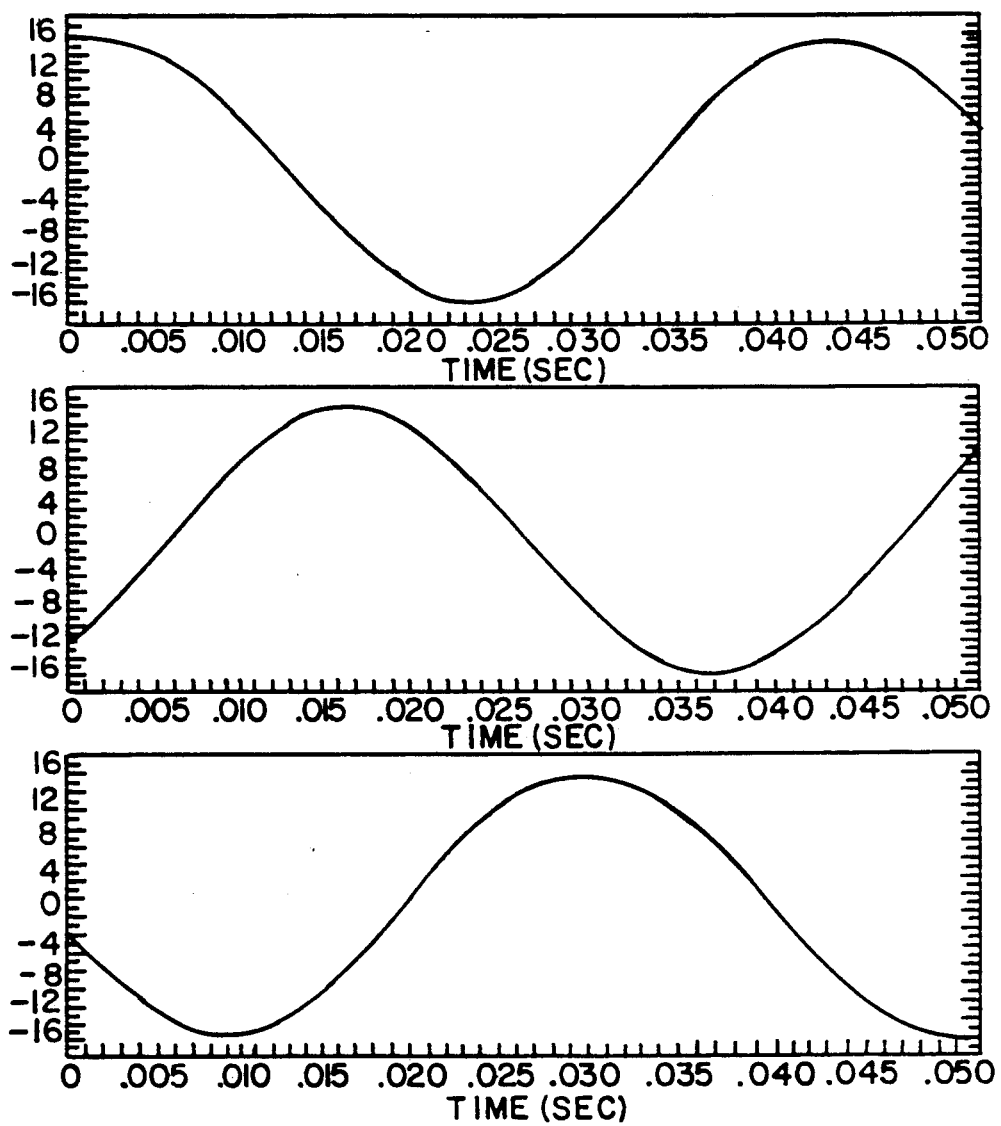
FIG. 11 is a series of curves illustrating the simulated phase currents.

The operability of the invention was first demonstrated by a computer simulation and later by a working embodiment of the invention. All three phase currents, produced by simulation are illustrated in FIG. 11. These predicted currents were later demonstrated by the experimental embodiment of the invention. Additionally, the system may be modified to incorporate dynamic breaking.

We claim:

1. A controller for controlling the flow of electric energy between a DC power source and an AC load, said controller including a series resonant link converter with the maximum and the minimum values of the AC output voltage of each resonant cycle of said series resonant link converter being a function of the output voltage of said DC source, the AC load converter and the initial current flowing in the inductor of said series resonant link converter at the beginning of each resonant cycle; comprising in combination:

(a) a series resonant link converter including at least an inductor and a capacitor coupled in series, said series resonant link converter being selectively coupled between first and second terminals of a said DC power source to produce said AC output voltage;

(b) switch means coupled to said series resonant link converter and operable in response to first switching signals to selectively control the magnitude and the direction of said initial current flowing in said inductor at the beginning of each resonant cycle of said series resonant link converter such that the maximum amplitude and the minimum amplitude of said AC output voltage of said series resonant link converter are controlled to the desired values;

(c) means responsive to second switching signals to selectively couple said AC output voltage to said AC load, thereby controlling the flow of energy between said DC power source and said AC load; and (d) control means responsive to the phase currents associated with said AC load and to said second switching signals for producing said first switching signals.

2. A controller in accordance with claim 1 wherein said switch means comprises means for establishing said initial current in said inductor, said initial current having a first polarity under first preselected conditions and a second polarity under second preselected conditions.

3. A converter in accordance with claim 2 further including means for determining the phase currents of said AC load and in response thereto determining the desired direction and the desired amplitude of said initial current at the beginning of each resonant cycle.

4. A series resonant link converter for converting a DC voltage to an AC output voltage suitable for operating an AC machine, comprising in combination:

(a) a series resonant link converter including at least first and second reactive circuits adapted to be coupled between first and second terminals of said DC source to produce said AC output voltage, the maximum amplitude and the minimum amplitude of said AC output voltage being a function of an initial current in said first reactive circuit;

(b) switch means responsive to switching signals for establishing said initial current at the beginning of each resonant cycle of said series resonant link converter thereby producing said AC output voltage suitable for operating said AC machine across said second reactive circuit element, said AC output voltage having a preselected maximum amplitude and including selected time intervals during which said AC output voltage has an amplitude of substantially zero, said maximum amplitude of said AC output voltage being a function of the output voltage of said DC source, said initial current, and the duration of said time interval during which the amplitude of said AC output voltage is substantially zero also being a function of said initial current; and (c) means responsive to signals indicative of the load current being supplied by said converter to generate said switching signals.

* * * * *